United States Patent [19]

Rohling et al.

[11] Patent Number: 6,147,638
[45] Date of Patent: Nov. 14, 2000

[54] METHOD FOR OPERATING A RADAR SYSTEM

[75] Inventors: Hermann Rohling, Wolfenbüttel; Ralph Mende, Braunschweig, both of Germany

[73] Assignee: Automotive Distance Control Systems, Germany

[21] Appl. No.: 09/208,415

[22] Filed: Dec. 10, 1998

[30] Foreign Application Priority Data

Dec. 10, 1997 [DE] Germany .......................... 197 54 720

[51] Int. Cl.[7] .............................. G01S 13/36; G01S 13/58
[52] U.S. Cl. .............................. 342/109; 342/82; 342/89; 342/104; 342/105; 342/118; 342/127; 342/128; 342/134; 342/159; 342/200; 342/201
[58] Field of Search .................................. 342/73, 82–103, 342/104, 109–112, 118, 127–134, 175, 137, 201, 105, 200, 159

[56] References Cited

U.S. PATENT DOCUMENTS

| 3,883,871 | 5/1975 | Moore ........................................ 342/201 |
| 5,592,170 | 1/1997 | Price et al. . | |

FOREIGN PATENT DOCUMENTS

| 0031442A2 | 7/1981 | Germany . | |
| 42 446 08 A1 | 7/1994 | Germany . | |
| 4244608A1 | 7/1994 | Germany . | |
| 4433790A1 | 3/1996 | Germany . | |
| 42 44 608A1 | 7/1999 | Germany . | |
| 2134741 | 8/1984 | United Kingdom .................... 342/137 |

OTHER PUBLICATIONS

Currie N.C. & Brown C.E.: "Principles and 1 Applications of Millimeter–wave Radar" 1987, ARTECH HOUSE, USA XP00211118861 Paragraph 6.5.2: "Frequency Stepped High–Range–Resolution Technique" pp. 296–298.

Paragraph 13.3.3.: "Stepped Frequency Waveform", pp. 630–633.

Wehner, D.R.: "High Resolution Radar, Second Edition" 1995, ARTECH HOUSE, USA XP002118862 Paragraph 5.2: "Concept of synthetic range–profile generation", pp. 200–209.

*Primary Examiner*—Bernarr E. Gregory
*Attorney, Agent, or Firm*—Venable; George Spencer; Norman N. Kunitz

[57] ABSTRACT

In a method for operating a radar system, the object is to determine by simple means and at low cost the distance and/or the radial velocity of at least one target object with high resolution. For this purpose, in each measuring phase of the measurement process in the "pulse FMCW radar system", switchover between a transmission mode and a receiving mode is effected a multiple number of times and at short intervals of time. In the transmission mode, all receiving units of the radar system are switched off, while a pulse-shaped (frequency-modulated) transmission signal with time-successive transmission pulses having a specific pulse-on time and a specific carrier frequency is emitted from at least one transmitter unit of the radar system. In receiving mode, all transmitter units are switched off in the pulse-off times of the transmission pulses, while from at least one receiver unit all reflection signals originating from the last emitted transmission pulse are detected as received signal from the entire observation range before emission of the next transmission pulse. The distance and/or the radial velocity of the reflection objects is determined indirectly by the signal processing unit of the radar system by evaluation of the frequency difference and/or phase difference between the transmission signal and the received signal.

13 Claims, 2 Drawing Sheets

METHOD FOR OPERATING A RADAR SYSTEM

BACKGROUND OF THE INVENTION

Radar systems are used to determine the distance to moving or stationary objects (target objects) and/or to determine the (relative) velocity of moving or stationary objects (target objects) in different observation ranges (distance ranges). The main areas of application for radar systems are as a rule observation ranges with long distances between the radar and the target object(s) ("long-distance range", e.g., a distance of up to 150 km or 300 km depending on the application), for instance in aviation for flight safety or for navigation purposes. More recently, there are also applications for radar systems in observation ranges with a very short distance between radar and target object(s) ("close range", e.g. up to 20 m or 250 m depending on the application), for instance in motor vehicle applications for determining the distance to motor vehicles travelling in front or behind, or approaching from another direction, or to other reflection objects, and/or the relative velocity of motor vehicles travelling in front or behind, or approaching from another direction, or to other reflection objects. The analog, high-frequency signal (transmission frequency in the GHz range, typically between 18 GHz and 94 GHz) generated by the transmitter unit of the radar system by means of an oscillator and emitted from a (transmission) antenna is detected by the (receiving) antenna of the receiver unit of the radar system after having traversed a transmission path and after having been reflected at the target objects (reflection objects) situated in the observation range and this received signal (reflection signal) is evaluated after signal processing (further processing) with respect to propagation time and/or frequency shift or phase shift. The required distance and/or velocity information can be obtained from this.

The two commonly used radar systems, the pulse radar system and the FMCW radar system, differ with respect to the measuring principle, in particular in the generation of the transmission signal and in the variation of the transmission signal (over a period of time):

In the pulse radar system, the transmission signal is cyclically interrupted, i.e., transmission pulses are emitted with a specific pulse-on time from the transmitter unit. In the pulse-off times between two transmission pulses, the reflection signals of the preceding transmission pulses are detected by the receiver unit as received signals (alternating transmission mode and receiving mode). The distance to the target object(s) is determined by a direct (signal) propagation time measurement and the desired resolution (distance resolution) of the pulse radar system can be set by means of the pulse-on time (pulse width) of the transmission pulses. For distance selection when processing the received signal, "distance goals" are generally used corresponding to various signal pulse-on times and thus selective for a quite specific distance.

In the pulse radar system, it is advantageous that on the one hand transmission/receiving decoupling is easily possible, i.e., cross-talking of the transmission signal into the receiver unit can be prevented completely by suitably switching over from transmission to receiving mode (e.g., by means of transmission/receiving switches), and that on the other hand by presetting a gain related to the distance when processing a signal by controlling as a function of the propagation time the sensitivity of the signal gain ("Sensitivity Time Control" STC) the dynamic range of the received signal to be processed (the input dynamic response on detection of the received signal) can be reduced considerably.

The complexity of the pulse radar system and the associated high costs are disadvantageous because on the one hand the distance resolution depends solely on the pulse-on time and therefore with the very short pulse-on times needed to realize a high distance resolution (e.g., 1 m) a very fast signal processing of the received signal is also necessary (e.g., by digitally sampling the received signal by means of analog-to-digital converters with high clock frequency), and because on the other hand the signal processing of the received signal is very elaborate and furthermore is determined by the bandwidth of the transmission signal.

In the FMCW radar system, the transmission signal is emitted continuously from the transmitter unit ("continuous wave" cw), while the transmission frequency of the transmission signal is varied, i.e. it has a specific modulation curve due to frequency modulation (FM), and at the same time the received signal is detected by the receiver unit.

It is an advantage in the FMCW radar system that signal processing of the received signal is a relatively simple matter, even when the transmission signal has a large bandwidth, and that the distance and the relative velocity of the target objects (reflection objects) situated in the observation range can be determined with great accuracy and with high resolution in each case.

A disadvantage of the FMCW radar system is that, because the transmitter unit and the receiver unit are operating concurrently (concurrent transmission mode and receiving mode), a complex solution is required for adequate transmission-reception decoupling. This transmission-reception decoupling is realized, for example, either by installing separate antennas for transmission and reception or by using high class and thus costly components, in particular of couplers, which on the one hand results in high costs and on the other hand disturbing secondary effects (e.g. due to the non-ideal characteristics of the antennas or components).

OBJECT OF THE INVENTION

The object of the invention is to provide a method for operating a radar system in which the disadvantages associated with the operation of a pulse radar system and a FMCW radar system are avoided and with which it is possible, especially in a simple manner and at low cost, to determine the distance to at least one target object (reflection object) with high resolution (e.g., 1 m).

SUMMARY OF THE INVENTION

In the method presented here for operating a radar system, the distance from and/or the radial velocity of several reflection objects (in particular, all reflection objects situated in the observation range) can be distinctly determined concurrently or separately. For this purpose, provision is made during each measuring phase of a measurement process for multiple switching over between transmission mode and receiving mode at short intervals of time ($\mu s$ range). The ratio of transmission mode time to receiving mode time can be preset as required to suit the needs. In each measuring phase of the measurement process, a pulse-shaped transmission signal is emitted with transmission pulses of a specific pulse-on time (e.g., 1 $\mu s$) and a specific carrier frequency (transmission frequency) while at least one transmitter unit of the radar system is in the transmission mode. As long as the system is in transmission mode, all receiver units of the radar system are switched off. In the case of distance determination, a frequency-modulated transmission signal with superimposed transmission pulses is also emitted during at least one measuring phase of the measurement process, i.e., a frequency-modulated pulse-shaped transmission signal is provided with time-successive transmission pulses of a variable carrier frequency in successive frequency steps. In each measuring phase of the measurement process in the current transmission mode, i.e., in the pulse-off times of the transmission pulses, all reflection signals originating from the transmission pulse last emitted (from the transmission pulse of the previous transmission mode) are detected by at least one receiver unit of the radar system out of the entire observation range before changing to the next transmission mode, i.e. before emission of the next transmission pulse. In the receiving mode, all transmitter units of the radar system are switched off. In each measuring phase of the measurement process, the frequency difference and/or the phase difference between the transmission signal and the received signal (the Doppler frequency of all reflection objects in the observation range) is measured by the signal processing unit and from this the distance and/or the (radial) velocity of the reflection objects are determined. In the measuring phases of the measurement process with frequency modulation of the carrier frequency (transmission frequency), not only is the propagation time measured but also the Doppler shift. The distance and (radial) velocity of the reflection objects are determined by evaluating the transmission pulses of different carrier frequencies (transmission frequencies) and thus by measuring frequency differences and/or phase differences of the received signal. The pulse-on time of the transmission pulses emitted in the transmission mode can be selected as a relatively large value in relation to that in a comparable pulse radar system, especially because the (distance) resolution is determined by the frequency bandwidth of the frequency-modulated transmission signal rather than the pulse-on time.

Thus, on the one hand, as in the operation of a pulse radar system, the transmitter unit and the receiver unit are decoupled in terms of time by switching over from the transmission mode to the receiving mode and by the described time variation of the transmission signal the required input dynamic response for the detection of the received signal (reflection signal) is kept small; on the other hand, as in the operation of a FMCW radar system, the determination of distance and radial velocity of the reflection objects is performed indirectly by measurement of the frequency difference and/or phase difference between transmission signal and received signal (that is, not by direct measurement of the propagation time), and consequently high resolution and simple signal processing is made possible.

Preferably, in at least one measuring phase of the measurement process a linear frequency-modulated transmission signal is emitted with superimposed transmission pulses within a predetermined frequency bandwidth (i.e. a frequency-modulated pulse-shaped transmission signal is preset with successive transmission pulses of a linearly varied carrier frequency). Accordingly, the carrier frequency (transmission frequency) is kept constant during any one transmission pulse, but it is varied continually from one transmission pulse to the next within a given frequency bandwidth.

For example, a ramp-shaped variation of the frequency-modulated pulse-shaped transmission signal can be preset, i.e., in one measuring phase of the measurement process the carrier frequency (transmission frequency) of the transmission signal rises linearly and in another measuring phase of the measurement process (e.g., in the next measuring phase of the measurement process) the carrier frequency of the transmission signal falls linearly. Accordingly, in one measuring phase of the measurement process the carrier frequency (transmission frequency) is increased within the frequency bandwidth from a minimum frequency to a maximum frequency (ramp rise) and in another measuring phase of the measurement process it is reduced within the frequency bandwidth from the maximum frequency down to the minimum frequency (ramp drop).

In one measuring phase of the measurement process (e.g., in a measuring phase following the two measuring phases with the ramp-shaped variation of the frequency-modulated pulse-shaped transmission signal) the carrier frequency (transmission frequency) of the transmission signal can be preset as a constant value so that all the transmission pulses in this measuring phase are emitted with the same carrier frequency (transmission frequency). Consequently, only one measurement of the Doppler shift (frequency difference) is performed in this measuring phase and it is used to secure the results of measurement in the other measuring phases of the measurement process (plausibility consideration).

In at least one measuring phase of the measurement process, several successive transmission pulses with the same carrier frequency can be emitted within the frequency bandwidth of the transmission signal preset for the frequency modulation in one frequency step with constant carrier frequency in each case and with a specific time duration.

The signal processing unit can directly further process and digitize the received signal or reflection signal of the last emitted transmission pulse detected by the receiver unit in the pulse-off time of this transmission pulse (sampling of the analog received signal by analog-to-digital conversion). Alternatively, the signal processing unit can perform analog integration and then digitization on the reflection signals or received signals detected by the receiver unit in each pulse-off time from several successive transmission pulses.

In order to generate the pulse-shaped variation of the transmission signal (the transmission pulses) a switchover unit can be provided with suitable transmit/receive switches by means of which it is possible to switch over between transmission mode and receiving mode.

A (common) antenna can be provided for transmission mode and receiving mode where this antenna is switched over on changing from transmission mode to receiving mode and vice versa from receiving mode to transmission mode (e.g., by means of a RF switch).

In order to predetermine the frequency-modulated time variation of the transmission signal, a modulating VCO can be provided. For instance, a linear modulating VCO is provided for predetermining a linear frequency-modulated time variation of the transmission signal.

If several transmitter units and/or several receiver units are provided in the radar system for emitting the transmission signals and for detecting the received signals, different antennas, or at the same time several transmitter units and/or receiver units, can be used for different measurement processes and/or different measuring phases of a measurement process.

The simple method for operating a radar system offers the advantage of very high performance (high distance resolution) with little signal processing effort and low costs because:

on account of the alternation (especially at high switching frequency) between transmission mode and receiving mode and the switching off of receiver unit and transmitter unit, it is possible to decouple transmission and reception in terms of time and cross-talk between transmitter unit and receiver unit is prevented;

on account of the long pulse-on time of the transmission pulses and on account of the signal processing of the received signal that is equivalent to that of a FMCW radar system, little signal processing effort is required and good distance resolution is possible;

only a single antenna is needed that can be used for both transmission mode and receiving mode at the same time;

for the transmission pulses a variable and especially a large ratio of pulse-on time to pulse-off time can be predetermined (and thus a higher duty cycle), resulting in a high mean transmission performance of the radar system.

DESCRIPTION OF A PREFERRED EMBODIMENT

The method for operating a radar system will now be described in more detail with reference to a distance sensor for a motor vehicle distance warning system.

Distance sensors in motor vehicle distance warning systems are required to determine distinctly and with high resolution the distance (and possibly the relative velocity) of at least one target object, i.e., of vehicles, persons and other reflection objects travelling ahead, approaching from the opposite direction or following from behind, as a rule of all target objects situated in the observation range at one and the same time. For example, the desired distance distinctness range is 150 m (this is relatively short compared with other radar systems), the desired distance resolution 1 m, and the desired velocity resolution 1 m/s. In at least one measuring phase of the measurement process a transmission signal is emitted from the (transmission) antenna of the "pulse FMCW radar system" with a transmission frequency of, for instance, 76 GHz as "pulse FMCW signal". After traversing the transmission path, the reflection signal obtained by reflection from the motor vehicles travelling ahead or behind (target objects or reflection objects) is detected in the form of an analog signal by the (receiving) antenna. The same antenna is used here both for transmission mode and for receiving mode, although different antennas can be provided in order to cover different angular ranges in successive measurement processes. The multiple switching from transmission mode to receiving mode within a measuring phase of the measurement process takes place at short intervals of time by means of a RF switching unit that is operated by a control unit. The received signal is further processed by a signal processing unit and evaluated with respect to frequency shift (frequency difference) and/or phase shift (phase difference) and from this the distance information and possibly the velocity is obtained by spectral analysis.

Figure 1:
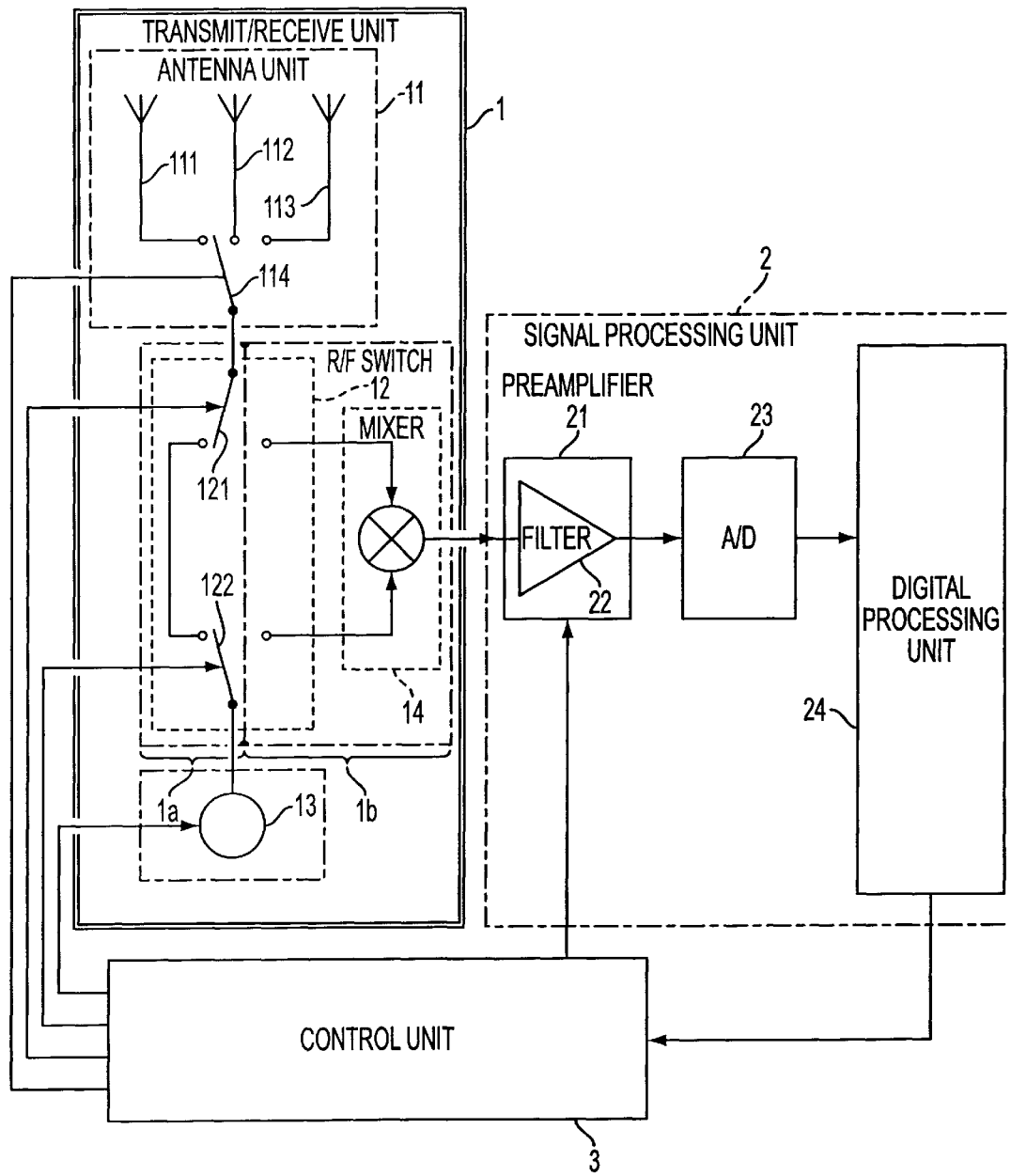
FIG. 1 shows a schematic block diagram of the radar system.

In accordance with FIG. 1, the "pulse FMCW radar system" is designed as follows:

A transmitter-receiver unit 1 with a "transmission side" 1a and a "receiving side" 1b that combines the functions of the transmitter unit and the receiver unit and whose main components are grouped together in the form of a unit module. The antenna unit 11 of the transmitter-receiver unit 1, designed for emitting the transmission signal and at the same time for detecting the received signal, has three antennas 111, 112 and 113 and an antenna switch 121 for selecting the required antenna 111 or 112 or 113, where each of the antennas 111, 112, 113 is selected in each case for one measurement process (each with a different angular range of the transmission signal). Switching of the antenna switch 121 is related to the duration of a measurement process (duration of a measurement process e.g., 5 ms to 15 ms). By means of the RF switching unit 12 with the two RF switches transmission-reception switch 121 and LO switch 122, it is possible to switch over between the transmission side 1a and the receiving side 1b of the transmitter-receiver unit 1, i.e. between the transmission mode and the receiving mode. The (synchronous) switching of the transmission-reception switch 121 and the LO switch 122 is performed at short intervals of time and in relation to the preset pulse-on time of the transmission pulses (pulse-on time e.g. 1 μs to 2 μs). In transmission mode, the two switches transmission-reception switch 121 and LO switch 122 are in the left-hand position (on the transmission side 1a), and in receiving mode the two switches transmission-reception switch 121 and LO switch 122 are in the right-hand position (on the receiving side 1b). By means of an oscillator 13 (power e.g. 10 mW), designed for example as a VCO, a RF beam is generated with the oscillator frequency 76 GHz. In addition, the linear modulated oscillator 13 can be switched linearly in the oscillator frequency (switchover frequency e.g. 500 kHz), i.e. the carrier frequency of the transmission pulses can be varied successively within a preset frequency bandwidth. In the measuring phases of the measurement process, repeated switchover from transmission mode to receiving mode takes place: for example, the pulse repetition frequency $f_{PW}$ is 500 kHz, i.e. switchover from transmission mode to receiving mode takes place every 2 μs, or the pulse interval $T_P$ of a duty cycle comprising pulse-on time $t_{ON}$ and pulse-off time $t_{OFF}$ is, for example, 2 μs. For example, pulse-on time $t_{ON}$ and pulse-off time $t_{OFF}$ are preset with the same length, that is for a pulse interval $T_P$ of a duty cycle of 2 μs the pulse-on time $t_{ON}$ is 1 μs and the pulse-off time $t_{OFF}$ is 1 μs. The reflection signals of all target objects (reflection objects) emanating from the last emitted transmission pulse are detected as received signal by the receiving side 1b of the transmitter-receiver unit 1 before emission of the next transmission pulse (i.e. before switching over again from receiving mode to transmission mode). A mixer 14 provided in the receiving side 1b of the transmitter-receiver unit 1 (the mixing frequency corresponds, for example, to the present carrier frequency of the transmission signal) transfers the received signal as a mixed signal to the baseband by multiplying it by the oscillator frequency which is constant during the time of a transmission pulse.

A signal processing unit 2 made up of preamplifier 21, filter 22, analog-to-digital converter (ADC) 23 and digital processing unit 24 for signal processing (further processing) of the mixed signal. The mixed signal amplified by the preamplifier 21 is filtered by the (analog low-pass) filter 22 (e.g., a Butterworth filter of the $7^{th}$ order). The filtered (analog) mixed signal is sampled by the analog-to-digital converter 23 and digitized by it. In the digital processing unit 24, processing of the digital signal takes place by spectral analysis in which, for example, a discrete Fourier transformation (DFT) is applied. Sampling is always performed at the same position of the received signal, for example at the end of each frequency step with a length of 2 μs. Consequently, only a small amount of computation is required when sampling and a low-cost analog-to-digital converter can be used at the interface between analog part (transmitter-receiver unit 1, preamplifier 21, filter 22) and digital part (digital processing unit 24) with a relatively low clock frequency.

A control unit 3 which is responsible for operating the two RF switches transmission-reception switch 121 and LO switch 122 of the RF switching unit 12 and for modulating oscillator 13. For synchronization of the transmitter-receiver unit 1 and the signal processing unit 2, the control unit 3 is driven by the digital processing unit 24.

Figure 2:
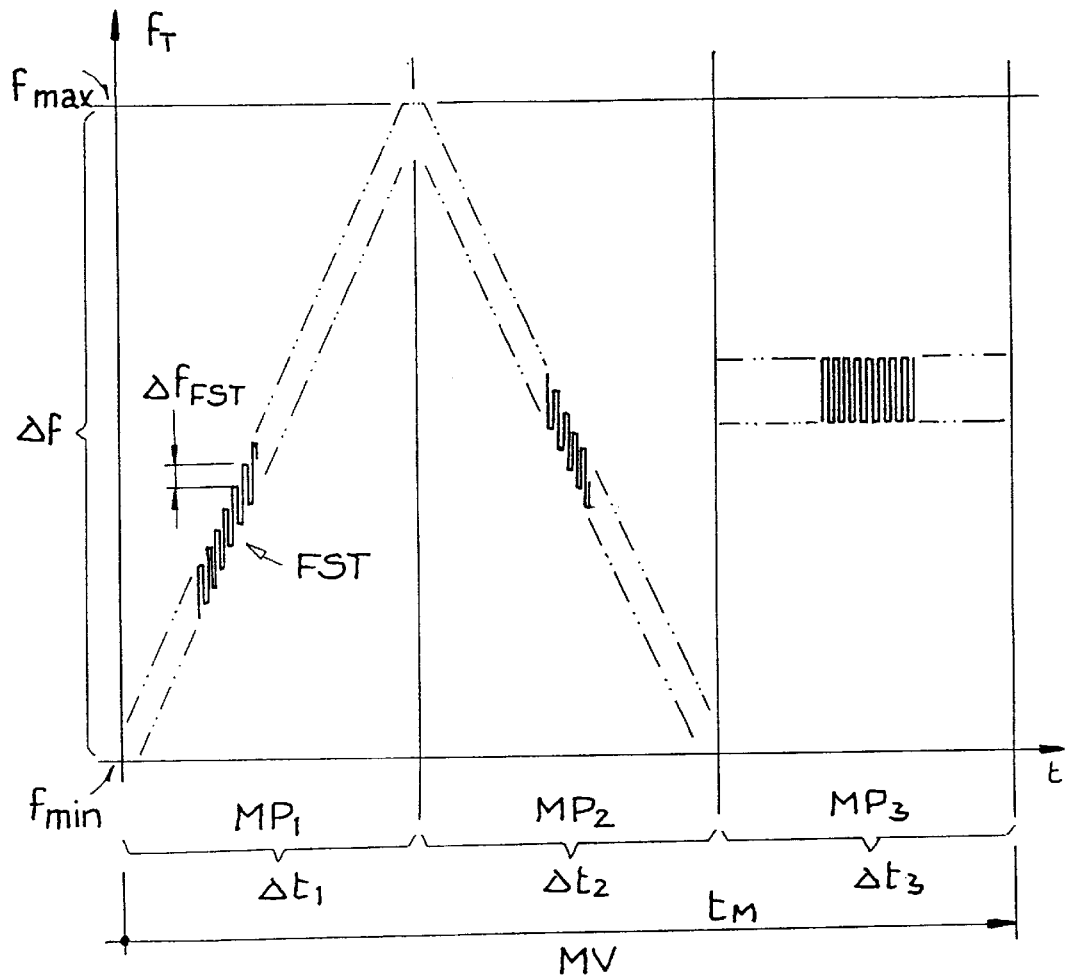
FIG. 2 shows the time variation of the transmission signal during a measuring process with several measuring phases.

In accordance with the time variation of a measurement process MV shown in FIG. 2, the measurement process MV (duration $t_M$, e.g., 6 ms) is divided into three equally long successive measuring phases MP1, MP2, MP3 (with duration Δt1, Δt2, Δt3 respectively):

In the measuring phase MP1 (duration Δt1, e.g., 2 ms), the carrier frequency $f_T$ (transmission frequency) of the transmission pulses is incremented by one frequency difference $\Delta f_{FST}$ at a time between the minimum frequency $f_{MIN}$ and the maximum frequency $f_{MAX}$ in successive frequency steps FST within the frequency bandwidth Δf ($\Delta f = f_{MAX} - f_{MIN}$, e.g., 50 to 300 MHz). The frequency difference measured at each target object is influenced by the distance and the velocity of the target object.

In the measuring phase MP2 (duration Δt2, e.g., 2 ms), the carrier frequency $f_T$ (transmission frequency) of the transmission pulses is decremented by one frequency difference $\Delta f_{FST}$ at a time between the maximum frequency $f_{MAX}$ and the minimum frequency $f_{MIN}$ in successive frequency steps FST within the frequency bandwidth Δf ($\Delta f = f_{MAX} - f_{MIN}$, e.g. 50 to 300 MHz). The frequency difference measured at each target object is influenced by the distance and the velocity of the target object.

In the measuring phase MP3 (duration Δt3, e.g., 2 ms), the carrier frequency $f_T$ (transmission frequency) of the transmission pulses is kept constant, e.g., at a carrier frequency $f_T$ of 76 GHz. Consequently, a pure Doppler measurement is performed which serves to validate the measurement results from the two measuring phases MP1 and MP2.

In all three measuring phases MP1, MP2, MP3 of a measurement process MV, switchover is performed once from transmission mode to receiving mode within each frequency step FST so that a pulse-shaped curve is superimposed on the carrier frequency $f_T$ (transmission frequency). In particular, a frequency-modulated pulse-shaped transmission signal is obtained in the two measuring phases MP1 and MP2 (i.e., during the ramp-shaped variation of the transmission signal).

Figure 3:
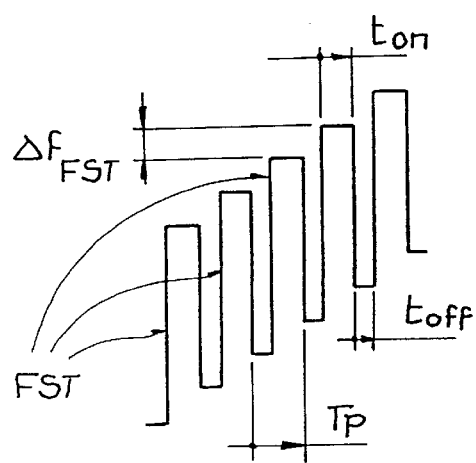
FIG. 3 shows an enlarged excerpt of the time variation of the transmission signal during a measuring phase of the measurement process.

In accordance with FIG. 3, the (pulse-shaped) time variation of the carrier frequency $f_T$ (transmission frequency) over several successive frequency steps FST is shown enlarged as an example of the measuring phase MP1 given in FIG. 2. The period $T_P$ of a pulse cycle of the transmission pulses is made up of the pulse-on time $t_{ON}$ or the transmission interval (transmission mode) and the pulse-off time $t_{OFF}$ or the receiving interval (receiving mode). The pulse repetition frequency $f_{PW}$ is therefore expressed as $f_{PW} = T_P^{-1} (T_P = t_{ON} + t_{OFF})$, and the so-called "Duty Cycle" D as $D = t_{ON}/T_P$. The mean transmission power and thus the range of the radar system is determined by the pulse-on time $t_{ON}$ of the transmission pulses. For example, the pulse-on time $t_{ON}$ and the pulse-off time $t_{OFF}$ are each preset at 1 μs (period $T_P$ of a pulse cycle is thus 2 μs), and this results in a duty cycle D of 50%.

Signal processing and evaluation of the received signal takes place largely as in a FMCW radar system and therefore it will not be described in detail here. However, when drawing up the specifications of the method the following must be observed:

The desired distance resolution (high-sensitivity resolution) ΔR of the radar system determines the bandwidth Δt of the carrier frequency $f_T$:

$$\Delta R = \frac{1}{2} c / \Delta f \text{ (c=speed of light)};$$

i.e. the distance resolution ΔR is not determined by the pulse-on time $t_{ON}$ of the individual transmission pulses but only by the frequency bandwidth Δf of the carrier frequency $f_T$ (the frequency deviation of the carrier frequency $f_T$) over all frequency steps FST. For a desired distance resolution ΔR of 1.2 m, for example, the bandwidth Δf of the carrier frequency $f_T$ is, for example, 120 MHz. During measuring phase MP1, for example, the carrier frequency $f_T$ is incremented from 76.5 GHz to 76.62 GHz; during measuring phase MP2 it is decremented from 76.62 GHz to 76.5 GHz; and during measuring phase MP3, the carrier frequency $f_T$ is kept constant at, for example, 76.5 GHz.

The desired velocity resolution of the radar system Δv is determined by the duration Δt1, Δt2, Δt3 of the measuring phases MP1, MP2 and MP3. For example, with a velocity resolution Δv of 1 m/s or 3.6 km/h and a carrier frequency $f_T$ of 76 GHz, a duration Δt1, Δt2, Δt3 results of 2 ms in each case for the individual measuring phases MP1, MP2 and MP3 respectively.

The distance distinctness range $R_E$ of the radar system is determined by the period $T_P$ of a pulse cycle or the pulse repetition frequency $f_{PW}$:

$$R_E = T_P \cdot c.$$

For example, in each measuring phase MP1, MP2, MP3 with a respective duration Δt1, Δt2, Δt3 of 2 ms in each case, 1000 frequency steps FST ($N_{FST}=1000$) are performed with discrete transmission frequencies (carrier frequencies $f_T$) that differ each time by $\Delta f_{FST} = \Delta f / N_{FST} = 120$ kHz. For example, one sampling of the time-continuous received signal is performed per frequency step FST. This means that for each frequency step FST one obtains one sampling value for the digital signal processing, that is per measuring phase MP1, MP2, MP3 a total of $N_{FST}$ sampling values. Spectral analysis and target detection is performed with the $N_{FST}$ sampling values within a measuring phase MP1, MP2, MP3. These processing steps are comparable to those of a FMCW radar system.

What is claimed is:

1. Method for operating a radar system including at least one transmitter unit (1a), at least one receiver unit (1b) and one signal processing unit (2), and wherein said method comprises, during a measurement process (MV) with at least one measuring phase (MP1, MP2, MP3), determining at least one of the distance and the radial velocity of reflection objects situated in the observation range by:

in each said measuring phase (MP1, MP2, MP3) of the measurement process (MV), switching over between a transmission mode and a receiving mode a multiple number of times and at short intervals of time;

each time the transmission mode is switched on, switching off all receiver units (1b) of the radar system, and emitting from said at least one transmitter unit (1a) of the radar system, a pulse-shaped transmission signal having time-successive transmission pulses in time sequence and having a specific pulse-on time ($t_{ON}$) and a specific carrier frequency ($f_T$), and in the case of distance determination, emitting a frequency-modulated pulse-shaped transmission signal in at least one said measuring phase (MP1, MP2) of the measurement process (MV);

each time the receiving mode is switched on, switching off all transmission units (1a) of the radar system in the pulse-off times ($t_{OFF}$) of the transmission pulses, and detecting, in said at least one receiver unit (1b) of the radar system, all reflection signals originating from the last emitted transmission pulse as received signals from the entire observation range before emission of the next transmission pulse; and determining, in the original processing unit (2), at least one of the distance and the radial velocity of all reflection objects situated in the observation range by evaluating at least one of the frequency difference and phase difference between the transmission signal and the received signals.

2. Method in accordance with claim 1, wherein, in at least one said measuring phase (MP1, MP2) of the measurement process (MV), frequency-modulating the carrier frequency ($f_T$) of the transmission pulses in predetermined frequency steps (FST).

3. Method in accordance with claim 2, wherein, in at least one said measuring phase (MP1, MP2) of the measurement process (MV), linearly frequency-modulating the carrier frequency ($f_T$) of the transmission pulses within a predetermined frequency bandwidth ($\Delta f$).

4. Method in accordance with claim 3, wherein, in at least one said measuring phase (MP1) of the measurement process (MV), frequency-modulating the carrier frequency ($f_T$) of the transmission pulses with a linear rise and, in at least one other measuring phase (MP2) of the measurement process (MV), frequency-modulating the carrier frequency ($f_T$) of the transmission pulses with a linear fall.

5. Method in accordance with claim 1, wherein, in at least one said measuring phase (MP3) of the measurement process (MV), holding the carrier frequency ($f_T$) of the transmission pulses constant.

6. Method in accordance with claim 1, wherein, in at least one measuring phase of the measurement process, emitting several transmission pulses with constant carrier frequency ($f_T$) each time during one frequency step (FST).

7. Method in accordance with claim 1, further comprising determining at least one of the distance and the radial velocity of all reflection objects situated in the observation range at one and the same time.

8. Method in accordance with claim 1, further comprising integrating the reflection signals of several time-successive transmission pulses in analog form and then digitizing the integrated reflection signals in the signal processing unit (2).

9. Method in accordance with claim 1, further comprising digitizing the reflection signals of the transmission pulse last emitted directly in the signal processing unit (2).

10. Method in accordance with claim 1, further comprising performing said switching over between transmission mode and receiving mode by a RF switching unit (12) that is connected to said at least one transmitter unit (1a) and said at least one receiver unit (1b).

11. Method in accordance with claim 1, wherein said at least one transmitter unit (1a) and said at least one receiver unit (1b) are integrated in a transmitter-receiver unit (1).

12. Method in accordance with claim 1, wherein the transmission pulses have a high ratio of pulse-on time ($t_{ON}$) to pulse-off time ($t_{OFF}$).

13. Method in accordance with claim 12, wherein said specific carrier frequency ($f_T$) of the pulse-shaped transmission signal is constant during the pulse-on time ($t_{ON}$).

\* \* \* \* \*